Patented Apr. 25, 1950

2,505,268

UNITED STATES PATENT OFFICE 2,505,268

MONOAZO DYESTUFFS

Willy Widmer, Bottmingen, and Heinrich Zollinger, Basel, Switzerland, assignors to Ciba Limited, Basel, Switzerland, a Swiss firm No Drawing. Application May 5, 1947, Serial No. 746,156. In Switzerland May 31, 1946

3 Claims. (Cl. 260—199)

According to this invention valuable new monoazo-dyestuffs are made by coupling a diazotized 2-amino-5-acylamino-1:1'-diphenyl sulfone in an acid medium with a 2-alkylamino- or a 2-hydroxyalkylamino - 8 - hydroxynaphthalene - 6 - sulfonic acid containing in the alkyl- or hydroxyalkyl radical up to six carbon atoms.

The phenyl radical of which the 1'-position is bound to the —$SO_2$-group in the 2-amino-5-acylamino-1:1'-diphenyl sulfones used as starting materials may be free from substituents or may contain substituents. As such substituents there come into consideration, for example, alkyl groups such as methyl groups, halogen atoms such as bromine and especially chlorine, alkoxy groups such as methoxy groups, and the like. The acylamino group present in the 5-position of the 2-amino-5-acylamino-1:1'-diphenyl sulfones may be for example, an amino group containing an aliphatic acyl radical such as a propionylamino group or an acetylamino group, or an amino group containing an aromatic acyl radical especially a benzoylamino group. In the latter case the benzoyl radical may be free from further substituents or it may contain substituents. As such substituents there may be mentioned for example halogen atoms such as bromine and especially chlorine atoms, nitro groups, alkyl groups such as ethyl and especially methyl groups, alkoxy groups such as ethoxy and especially methoxy groups, and the like.

The 2-amino-5-acylamino-1:1'-diphenyl sulfones used as starting materials are in part known and in part new, and can be obtained, for example, by known methods from the appropriate 2:5-diamino-1:1'-diphenyl sulfones by monoacylation with the usual acylating agents, for example, acid anhydrides or acid halides.

As examples of 2-amino-5-acylamino-1:1'-diphenyl sulfones which can be made by such methods and used as diazo-components in the invention the following may be mentioned: 2-amino-5-benzoylamino-1:1'-diphenyl sulfone, 2-amino-5-benzoylamino-4'-methyl - 1:1'-diphenyl sulfone, 2-amino-5-(3''-nitrobenzoylamino) - 4'-methyl-1:1'-diphenyl sulfone, 2-amino-5-(4''-nitrobenzoylamino) - 4'-methyl - 1:1' - diphenyl sulfone, 2-amino-5-(4''-methoxybenzoylamino) - 1:1'-diphenyl sulfone, 2-amino-5-(2''-chlorbenzoylamino)-1:1'-diphenyl-sulfone, 2 - amino-5- (4''-chlorbenzoylamino) - 1:1' - diphenyl sulfone and 2-amino-5-acetylamino-4'-methyl - 1:1'-diphenyl sulfone.

The alkyl radical in the 2-alkylamino-8-hydroxynaphthalene-6-sulfonic acids used as starting materials may be a methyl, ethyl, propyl, butyl, isobutyl, isoamyl or hexyl radical. If a 2-hydroxyalkylamino - 8 - hydroxynaphthalene-6-sulfonic acid is used as starting material it may be for example 2-($\beta$-hydroxyethylamino)-8-hydroxynaphthalene-6-sulfonic acid or 2-($\beta$:$\gamma$-dihydroxypropylamino) - 8 - hydroxynaphthalene-6-sulfonic acid.

The diazotization of the 2-amino-5-acylamino-1:1'-diphenyl sulfone may be carried out by methods usual for compounds which are difficult to diazotize, for example, by means of nitrosylsulfuric acid. As a rule it is of advantage to separate the diazo-compound, for example, by dilution with water and filtration, and to couple the filter cake with a suspension of the 2-alkylamino- or 2 - hydroxyalkylamino - 8 - hydroxynaphthalene-6-sulfonic acid. The 2-alkylamino- or 2-hydroxyalkylamino-8 - hydroxynaphthalene - 6 - sulfonic acids used as coupling components are advantageously first converted into a mono-alkali salt, and then reconverted into the free acids, for example, by the addition of acetic acid. Coupling is conducted in an acid medium, advantageously a medium rendered weakly acid to Congo with acetic acid. Thus, for example, the precipitated and filtered diazo-compound may be coupled with a suspension of the coupling component rendered weakly acid to Congo, and then the free mineral acid already present and also that which is formed during the coupling reaction neutralized, for example, with sodium acetate, and, if desired, the temperature may be raised somewhat. The coupling mass may be worked up in the usual manner in itself known, for example, by neutralization with sodium carbonate, separation by filtration, and drying.

The dyestuffs obtainable by the invention are new and in the form of the free acids correspond to the general formula in which $R_2$ and $R_3$ represent radicals of the benzene series, the radical $R_3$ containing the —$SO_2$—$R_2$ group in ortho-position with respect to the azo-group and the —NH—acyl group in paraposition thereto, and in which $R_4$ represents an alkyl or a hydroxy-alkyl radical, containing up to six carbon atoms.

These dyestuffs are suitable for dyeing or printing a very wide variety of materials, especially those of animal origin such as leather or silk and principally for dyeing or printing various artificial fibers, for example, animalized artificial silk, superpolyamides or superpolyurethanes, etc.

As compared with the known dyestuffs (see, for example, U. S. Patent No. 1,359,969) of similar constitution which are obtained by coupling diazotized N-monoacyl-derivatives of phenylene diamine aryl sulfones with 2-amino-8-hydroxynapthalene-6-sulfonic acids or N-aryl derivatives thereof in an acid medium, and which are distinguished by the good fastness properties of their dyeings on wool, the dyestuffs obtainable by the present invention are in many cases distinguished by the unexpected advantage of improved solubility, while in other respects possessing the good fastness properties of the aforesaid known products.

The following examples illustrate the invention, the parts being by weight:

*Example 1*

33.6 parts of 2-amino-5-benzoylamino-4'-methyl-1:1'-diphenyl sulfone are introduced into a solution of nitrosylsulfuric acid (corresponding to 7 parts of sodium nitrite) in sulfuric acid. When the diazotization is complete, the whole is poured on to ice, and the precipitated diazo-compound is separated by filtering with suction. 25.3 parts of 2-methylamino-8-hydroxynaphthalene-6-sulfonic acid are thoroughly pasted with 13.5 parts of caustic soda solution of 30 per cent. strength and 10 parts of water, and the acid is liberated from the resulting sodium salt by means of an excess of acetic acid. The diazo-compound is triturated with this paste. After a short time the whole is diluted with 200 parts of water, and the free sulfuric acid is gradually neutralized at a moderately raised temperature by means of sodium acetate solution. When the coupling is complete, the whole is neutralized with sodium carbonate, and the dyestuff is separated by filtration and dried. It is a dark powder which dissolves in water with a violet coloration and dyes wool from an acid bath fast reddish violet tints.

In the following table are described a few further dyestuffs obtainable from various 2-amino-5-acylamino-1:1'-diphenylsulfones as diazo-components and 2-methyl-amino-8-hydroxynaphthalene-6-sulfonic acid by the process of this example:—

| | Diazo-component | Obtainable from— | Melting point °C. | Tint of the dyeing on wool from an acetic acid bath |
|---|---|---|---|---|
| 1 | 2-amino-5-benzoylamino-1:1'-diphenyl sulfone. | 2:5-diamino-1:1'-diphenyl sulfone and benzoyl chloride. | 197–198 | reddish violet. |
| 2 | 2-amino-(3"-nitrobenzoylamino)-4'-methyl-1:1'-diphenyl sulfone. | 2:5-diamino-4'-methyl-1:1'-diphenyl sulfone and 3-nitrobenzoyl chloride. | 207–210 | brownish violet. |
| 3 | 2-amino-(4"-nitrobenzoylamino)-4'-methyl-1:1'-diphenyl sulfone. | 2:5-diamino-4'-methyl-1:1'-diphenyl sulfone and 4-nitrobenzoyl chloride. | 228–230 | Do. |
| 4 | 2-amino-(4"-methoxybenzoylamino)-1:1'-diphenyl sulfone. | 2:5-diamino-1:1'-diphenyl sulfone and 4-methoxybenzoyl chloride. | 176–177 | bluish violet. |
| 5 | 2-amino-(2"-chlorbenzoylamino)-1:1'-diphenyl sulfone. | 2:5-diamino-1:1'-diphenyl sulfone and 2-chlorbenzoyl chloride. | 190–194 | Do. |
| 6 | 2-amino-(4"-chlorbenzoylamino)-1:1'-diphenyl sulfone. | 2:5-diamino-1:1'-diphenyl sulfone and 4-chlorbenzoyl chloride. | 174–176 | Do. |

*Example 2*

The separated and filtered diazo-compound obtained from 33.6 parts of 2-amino-5-benzoylamino-4'-methyl-1:1'-diphenyl-sulfone by the procedure of Example 1 is triturated with 29.5 parts of 2-butylamino-8-hydroxynaphthalene-6-sulfonic acid (obtained by pasting the latter acid with 13.5 parts of caustic soda solution and 10 parts of water and liberating the free acid from the resulting sodium salt by means of acetic acid). After a short time the whole is diluted with 200 parts of water, and the free sulfuric acid is gradually neutralized at a moderately raised temperature by means of sodium acetate solution. When the coupling is complete, the whole is neutralized with sodium carbonate, and the dyestuff is separated by filtration and dried. A dark, bluish powder is formed which dissolves in water with a violet coloration and dyes wool from an acetic acid bath somewhat reddish violet tints having excellent properties of fastness.

A dyestuff having very similar properties is obtained from 2-isobutylamino-8-hydroxynaphthalene-6-sulfonic acid.

By using 2-amino-5-acetylamino-4'-methyl-1:1'-diphenyl-sulfone as diazo-component, instead of 2-amino-5-benzoylamino-4'-methyl-1:1'-diphenyl sulfone, a dyestuff is obtained which dissolves in water with a violet coloration and dyes animal fibers from a sulfuric acid bath reddish violet tints having good properties of fastness.

Similar dyestuffs are obtained by coupling 2-amino-5-benzoylamino-4'-methyl-1:1'-diphenyl sulfone with 2-ethylamino-8-hydroxynaphthalene 6-sulfonic acid or with 2-($\beta$-hydroxyethylamino)-8-hydroxynaphthalene-6-sulfonic acid by the procedure described in this example.

*Example 3*

2 parts of the dyestuff obtainable as described in the first paragraph of Example 1 are dissolved in 4000 parts of water, 10 parts of crystalline sodium sulphate are added, and 100 parts of wool are entered at 40–50° C. 3 parts of acetic acid of 40 per cent. strength are then added, the bath is brought to the boil in the course of ½ hour, and dyeing is carried on at that temperature for ¾ hour. After rinsing and drying the goods a fast red-violet dyeing is obtained.

What we claim is:
1. A monoazo-dyestuff which in the form of the free acid corresponds to the general formula

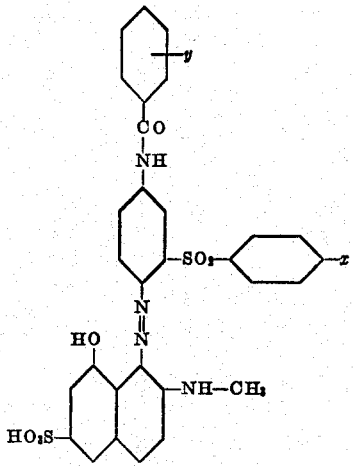

in which $x$ stands for a member selected from the group consisting of hydrogen and methyl, $y$ stands for a member of the group consisting of hydrogen, halogen, alkyl, alkoxy and nitro groups.

2. The monoazo-dyestuff of the formula

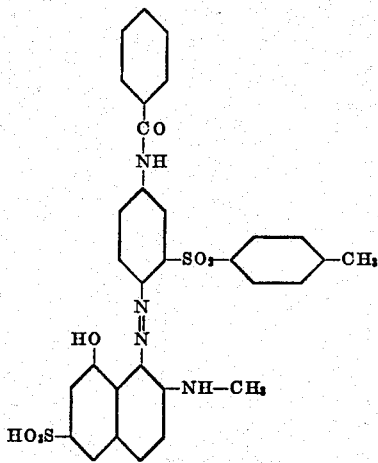

3. The monoazo-dyestuff of the formula

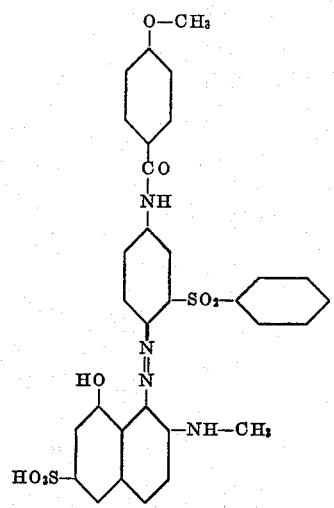

WILLY WIDMER.
HEINRICH ZOLLINGER.

REFERENCES CITED

The following references are of record in the file of this patent:

UNITED STATES PATENTS

| Number | Name | Date |
|---|---|---|
| 1,359,969 | Montmollin | Nov. 23, 1920 |
| 1,840,385 | Clingestein | Jan. 12, 1932 |
| 1,879,261 | Hoyer | Sept. 27, 1932 |
| 1,901,515 | Hentrich | Mar. 14, 1933 |
| 2,053,817 | Felix | Sept. 8, 1936 |
| 2,361,481 | Kvalnes | Oct. 31, 1944 |
| 2,374,158 | Knight | Apr. 17, 1945 |

Certificate of Correction

Patent No. 2,505,268                                                  April 25, 1950

WILLY WIDMER ET AL.

It is hereby certified that errors appear in the above numbered patent requiring correction as follows:

In the grant, line 2, name of co-inventor, for "Zolinger" read *Zollinger*; and in the printed specification, column 3, line 39, for "napthalene" read *naphthalene*; and that the said Letters Patent should be read with these corrections therein that the same may conform to the record of the case in the Patent Office.

Signed and sealed this 25th day of July, A. D. 1950.

[SEAL]

THOMAS F. MURPHY,
*Assistant Commissioner of Patents.*